United States Patent [19]

Frost

[11] 3,872,556
[45] Mar. 25, 1975

[54] GAS OPERATED QUICK DISCONNECT COUPLING

[75] Inventor: Richard H. Frost, Littleton, Colo.

[73] Assignee: Frost Engineering Development Corporation, Englewood, Colo.

[22] Filed: Jan. 5, 1973

[21] Appl. No.: 321,514

[52] U.S. Cl. .............................. 24/230 A, 244/151
[51] Int. Cl. ....................... B64d 17/30, B64d 17/38
[58] Field of Search.. 24/230 AL, 230 AN, 231 AV, 24/205.17, 205.18, 164, 171, 181; 244/151, 152, 147, 149, 122 R, 122.1, 122.2

[56] References Cited
UNITED STATES PATENTS

| | | | |
|---|---|---|---|
| 2,763,451 | 9/1956 | Moran | 24/230 AN |
| 3,183,568 | 5/1965 | Gaylord | 24/230 A |
| 3,215,220 | 11/1965 | Schoeffler | 24/230 AL |
| 3,624,813 | 11/1971 | Gaylord | 24/230 AV |
| 3,658,281 | 4/1972 | Gaylord | 24/230 A |
| 3,744,102 | 7/1973 | Gaylord | 24/230 A |
| 3,744,103 | 7/1973 | Gaylord | 24/230 A |
| 3,766,611 | 10/1973 | Gaylord | 24/230 A |

*Primary Examiner*—Casmir A. Nunberg
*Attorney, Agent, or Firm*—Burton, Crandell & Polumbus

[57] ABSTRACT

This invention relates to a gas operated quick disconnect coupling wherein a tongue of one member is detachably retained within a notch in a second member by a pair of slide blocks movable in a series of aligned passages therethrough between a latched position bridging the joints therebetween and a released position where said block ends line up therewith, the former being maintained by a shear pin while the latter is determined by a suitable stop or detent.

10 Claims, 4 Drawing Figures

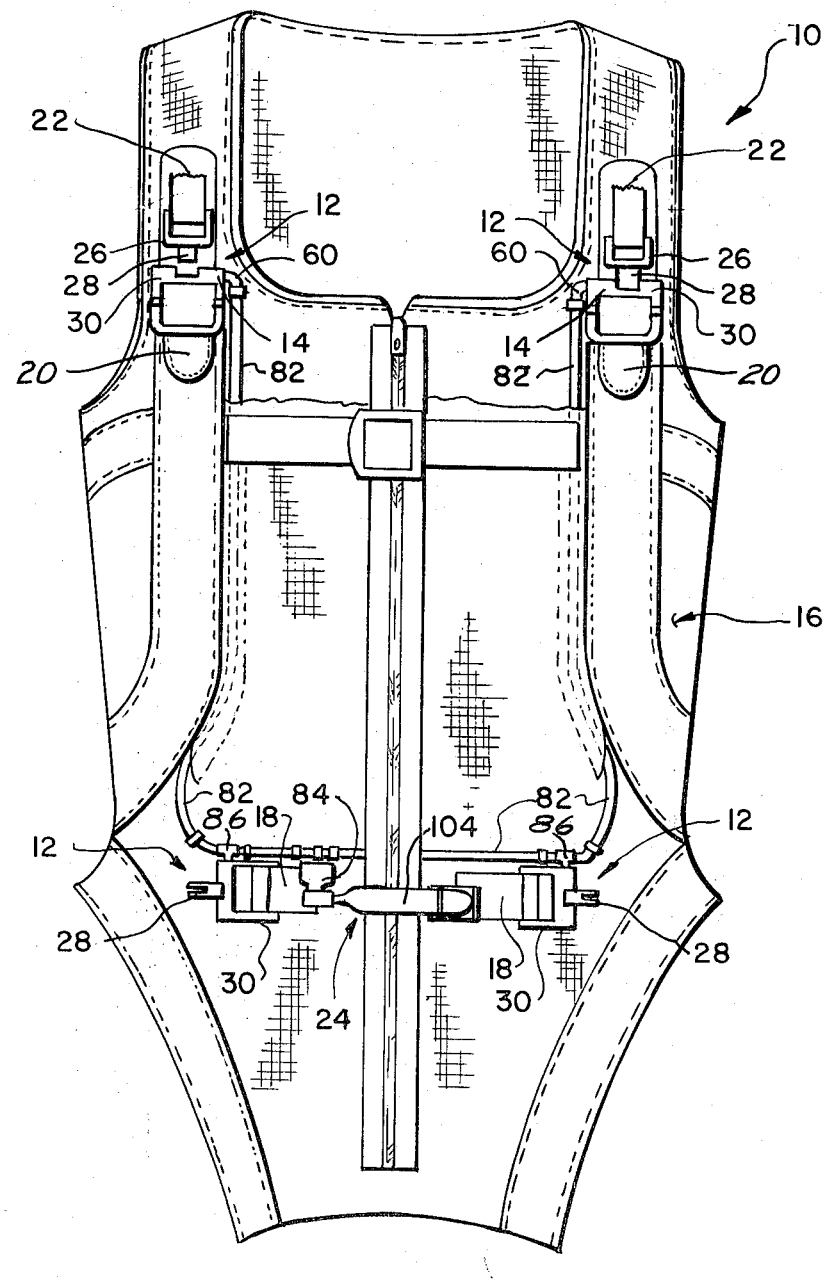
Fig_1

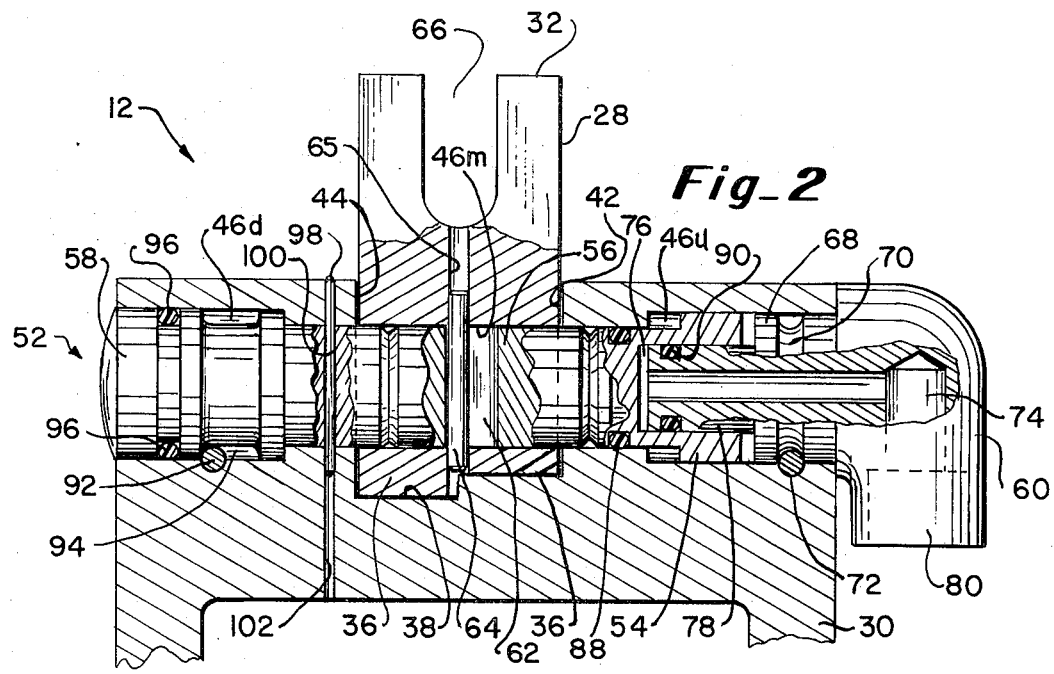
Fig_2
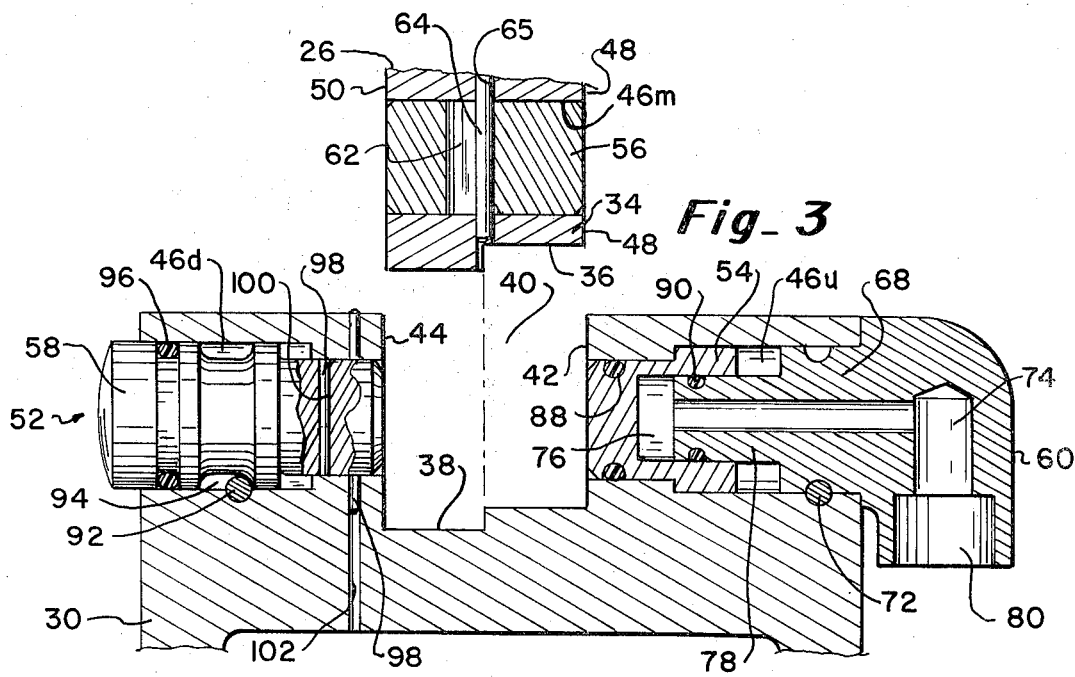
Fig_3
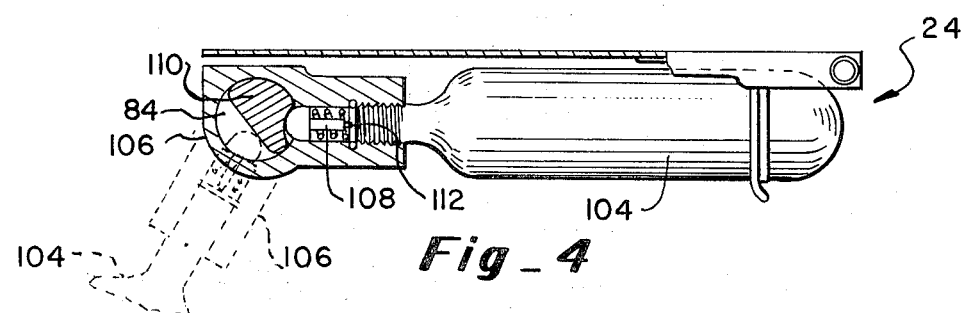
Fig_4

GAS OPERATED QUICK DISCONNECT COUPLING

Quick disconnect couplings of one type or another are widely known in the prior art and they are found used in many different ways, each having its own particular requirements often calling for highly specialized designs adapted to satisfy certain unique criteria. The quick disconnect coupling of the present invention is just such a unit in that it is specifically designed for use as an element in a complex divestment system by means of which an aircraft crew member can separate himself from connection to his equipment and the aircraft in certain specific emergency situations. It is in this environment that the coupling forming the subject matter hereof finds its primary application although, as will appear presently, it certainly is by no means limited to such application.

In a divestment system of the type under consideration, certain design features, some critical and some not, are preferably included in the quick disconnect coupling forming a part thereof. For instance, a coupling designed as a replacement for one part of a two element manually operated buckle already present as an integral part of the restraint and/or parachute harness has the advantage of integrating readily into existing systems under field conditions thus avoiding the time consuming and expensive retrofit problems so often associated with improvements to equipment already in use. Also by leaving the manually disconnectable element of the existing buckle in the system, something short of ultimate reliability can be tolerated in the quick disconnect couplings for the obvious reason that a malfunction in the latter still leaves the user with the same option he had before, namely, to divest himself from the restraining connections manually.

In the stress accompanying an emergency situation there is always the possibility that the user will accidentally operate the divestment system and, in so doing, uncouple himself from the very life saving and life support systems he must rely upon in other situations to save his life or prevent serious injury such as, for example, the harness fastening him to his ejection seat and parachute. Thus, it becomes imperative that the quick disconnect couplings in such a divestment system be quickly reconnectable without the aid of any tools. Along this same line, the design of the coupling should be such that it shows immediately when it has been actuated. On the other hand, once reconnected, there is no particular need for the coupling to have the capability of repeated or even a second actuation because the manual disconnect system adequately answers this need.

Other desirable features are such things as being able to actuate more than one quick disconnect coupling instantaneously and simultaneously from a common power source. Ideally, the placement of the power source and actuator therefor should be determined by their accessibility to the operator rather than having to place it in close proximity to the individual couplings operated thereby.

There remain, of course, many other significant design criteria of a more conventional nature such as compactness and the like that needn't be examined in detail. It should suffice to point out that the foregoing together with several additional noteworthy features considered either desirable or necessary in a quick disconnect coupling for a pilot divestment system have been realized in the unit forming the subject matter of the instant invention. For instance, it is readily adapted for connection to adjacent free ends of a strap as a buckle therefor or as a detachable coupling to be used as a replacement for one element of a two part manually disconnectable buckle. A number of such units can be operated from a single power source taking the form of either a cold compressed gas system or a pyrotechnically generated hot gas unit. Those quick-disconnect assemblies used as a replacement for the static member of a two-element manually disconnectable buckle fail safe as the system remains manually operable. Each unit can also be reset manually in case of an accidental actuation and they show immediately whether they have been actuated or not. No more than a few ounces of additional weight and less than an inch of extra length is added to each buckle subassembly when the gas-operated connector of the present invention is substituted for one element thereof and the entire system can be installed under field conditions by relatively unskilled personnel in a matter of an hour or so, most of the time being required to readjust the length of the straps in the harness and string or thread the gas lines between the power source and fittings actuated thereby.

A second objective of the within described invention is to provide a coupling of the type aforementioned that is ideally suited and specifically designed for use in a personnel divestment system for the pilot and crew of military aircraft.

Another object of the invention forming the subject matter hereof is the provision of a gas-operated disconnect fitting that will fail safe when used as a substitute for one element of a two-part manually actuated buckle subassembly.

Still another objective of the invention herein disclosed and claimed is to provide a pressure-actuated buckle member that can either be fired by releasing gas from a bottle source thereof or firing a suitable pyrotechnic device.

An additional object is the provision of a primary gas-operated divestment system which is supplemented by one part of a two-part manually operated buckle yet can be added to the latter without detracting from its capabilities.

Further objects are to provide a gas-operated divestment system that is versatile, compact,, reliable, rugged, lightweight, simple, easy to service, inexpensive and capable of being installed under field conditions by relatively unskilled persons without any special tools.

Other objects will be in part apparent and in part pointed out specifically hereinafter in connection with the description of the drawings that follows, and in which:

FIG. 1 is a front elevation showing the gas-operated quick disconnect couplings of the present invention integrated into the conventional manually operated divestment system of a torso harness, which is a combination of parachute and restraint harness;

FIG. 2 is a fragmentary view to an enlarged scale, partly in elevation and partly in section, showing the quick-disconnect coupling in latched condition;

FIG. 3 is a fragmentary view similar to FIG. 2 and to the same scale showing the coupling actuated into released position; and FIG. 4 is a top plan view, portions of which have been broken away and shown in section, delineating the bottlle gas power source and mechanism for puncturing same.

Referring next to the drawings for a detailed description of the present invention and, initially, to FIG. 1 for this purpose, reference numeral 10 has been chosen to broadly represent the combination manually operated and gasoperated divestment system that incorporates as a part thereof the buckle subassemblies 12 which, in turn, include the gas operated quick disconnect couplings 14 according to this invention. The entire divestment system 10 comprises a part of a conventional parachute harness or, as shown in FIG. 1, a torso restraint garment 16 as worn by some military aircraft crew members that incorporates the center section 18 of the lap belt and the parachute harness straps that connect onto the parachute risers 22. Each of the four buckle subassemblies includes the quick disconnect couplings of the present invention that have been broadly designated by reference numeral 14 and these are shaped, for example, for manual engagement with the connection shown as the female element 26 of the conventional two-part manually operated buckle such as that shown and described in U.S. Pat. No. 3,183,568 issued May 18, 1965, for "Canopy Release."

In the prior art manually operated restraint divestment system used with a torso harness garment 16, female buckle element 26 receives a tongue similar in many respects to the detachable tongue 28 of the quick disconnect coupling 14 except that, instead of being separable from the belt receiving portion 30 thereof, it is formed integral therewith to define the male element of the buckle assembly. In the instant divestment system illustrated in FIG. 1, on the other hand, detachable tongue 28 is manually connectable and disconnectable from female element 26 in exactly the same way it was before but, in addition, tongue 28 is separable from the belt receiving portion 30 of the coupling 14 by actuation of the power source 24 which may be any convenient source of fluid pressure. Thus, by providing a detachable connection at both ends of tongue 28 instead of just one end, a coupling is provided that can be unlatched in either of two different ways. The significant details of the quick disconnect coupling are revealed most clearly in FIGS. 2 and 3 to which reference will now be made.

Tongue 28 is shown with one end 32 (FIG. 2) shaped exactly like the male element of the manually operated buckle that mates with female element 26 and it connects and disconnects therefrom in exactly the same way. Of course, the manner in which tongue 28 connects to female element 26 of the conventional two-part buckle forms no part of the present invention and it is intended as being merely illustrative of one type of manually operable coupling that can be used. It is, therefore, in the other end 34 of the tongue that we begin to see some changes.

First of all, it can be seen that the tongue is polarized with respect to the belt receiving element 30 of the coupling 14 in that a pair of the mating surfaces 36 and 38 are shaped so as to fit together and seat properly only when said tongue is passed into notch 40 therefor in one particular way. In the specific form shown, the mating surfaces are step cut although, obviously, many other configurations will work just as well.

The tongue receiving notch 40 in the belt receiving portion 30 has the sides 42 and 44 thereof formed parallel to one another and normal to the axis of the transversely extending bolt passage 46 that extends therethrough and through the tongue. In like manner, the opposed faces 48 and 50 of the tongue are parallel to one another and normal to the bolt passage axis. The tongue slips easily in and out of notch 40 and moves relative to the belt receiving element in the direction of the tension applied to the belt or strap. Walls 42 and 48 lie in closely spaced face-to-face parallel relation as do walls 44 and 50.

Now, bolt passage 46 is shown in the form of a transverse bore which is certainly preferred even though passages of other than circular cross section could, of course, be used. The portion 46m of the bolt passage within the tongue is made coaxial with the portions 46u and 46d in the belt receiving portion at opposite ends thereof.

Mounted within the bore for limited axially slidable movement is a bolt subassembly that has been designated in a general way by reference numeral 52 and which includes a piston 54 and a shuttle trunnion 56 and a slidable block 58 arranged in end-to-end contacting relation that cooperate with one another to define shuttle trunnions. An elbow 60 is mounted in the bore upstream of piston 54 and is, in turn, connected to receive gas under pressure from the source 24 thereof in a manner that will be explained in greater detail presently.

The shuttle trunnion is preferably of the same length as the section of bore 46m within the tongue 28 because, otherwise, the unlocked position cannot be achieved. The entire bolt subassembly 52 must move from its locked into its unlocked position as a unit and this requires that the interface between the piston and upstream shuttle trunnion 56 be coincident with the joint between walls 42 and 48 while, at the same time, the interface between the upstream trunnion 56 and downstream slide block must be at the joint between walls 44 and 50. Of course, with shuttle trunnion 56 housed inside the tongue bore, faces 48 and 50 of the tongue and the corresponding ends of the shuttle element 56 can be fabricated as a unit so as to correspond with one another exactly.

Now, shuttle trunnion 56 contains a longitudinally extending coaxial slot 62 adapted to accept radial retaining pin 64 that intersects that portion of the bore 46 within tongue 28. Pin 64 is press-fitted within a radial passage 65 that extends from the step-cut face 36 into the bottom of elongate notch 66 in its end 32. The function of slot 62 and pin 64 is to retain shuttle trunnion 56 within the tongue and, as such, its length is not critical other than it must be long enough to permit axial movement of said slide block between its fully retracted locked position and its fully extended unlocked position. Slot 62 and pin 64 also serve as a stop adapted to align the faces of trunnion 56 and faces 48 and 50 of the tongue. An alternative construction would be one similar to that which mounts the neck 68 of elbow 60 within the bore for rotational movement relative to the belt-receiving member, namely, an annular groove 70 and a pin 72 intersecting the bore in essentially tangent relation to said groove as shown on the other end of the assembly. Obviously, in the case of shuttle trunnion 56, the width of such an annular groove would have to be sufficient to accommodate the full excursion of the block within the bolt passage or bore 46m as is the case with the other slide block 58, the details of which will be explained presently.

Elbow 60 is preferably pivotally mounted within the intake end of the belt receiving element by means of the annular groove and tangent pin structure just described, however, the swivel connection thus produced has nothing to do with the proper functioning of the unit. The right-angled gas passage 74 inside the elbow opens through a reduced diameter section 78 of neck 68 which telescopes into cup-shaped cavity 76 in the end of the piston 54. By telescoping these mating elements one inside the other as shown, it becomes possible to foreshorten the bolt subassembly to some degree and thus make the whole unit more compact, however, once again, such a feature is not critical insofar as the functioning of the unit is concerned and it would work just as well if the piston was a solid cylinder in end-to-end abutting relation to the portion of the elbow retained within the bolt passage 46u. The external leg 80 of the elbow connects onto a high pressure gas line or hose 82, two of which are shown in FIG. 1 coming off the power supply manifold 84. In place of the elbow 60, a T-connection 86 like those shown in FIG. 1 can be substituted therefor. The elbows are used only on terminal disconnect couplings, whereas, the T-connections are used for intermediate couplings in a series thereof. Obviously, the external leg of the elbow can be provided with any one of several conventional types of gas tight joints depending upon the type of high pressure hose or connection used. Piston 54 is shown encircled by an O-ring 88 at its downstream end which functions primarily as a dirt seal rather than a pressure element. The section of reduced diameter 78 on the neck 68 of the elbow 60 that telescopes into the piston cavity 76 on the other hand, is preferably provided with an O-ring gas seal 90 as shown.

Now, the combined length of elbow neck 69 and piston 54 when the former is fully telescoped inside the latter is considerably less than the length of the section of the bolt receiving bore 46u in which they are housed. This means, of course, that with shuttle trunnion 56 fully extended into abutting end-to-end relation with the adjacent end of piston 54, a portion of the upstream shuttle trunnion 56 will be housed inside the same section of the bolt passage that carries the piston thus bridging the joint between the tongue 28 and belt receiving element 30 defined by opposed parallel wall surfaces 42 and 48 as shown in FIG. 2. In so doing, the shuttle trunnion releasably locks the upstream side of the tongue into the belt-receiving element when in extended position.

The second element of the bolt subassembly 52, namely, slide block 58, functions in like manner to releasably lock the downstream end of the tongue into the belt-receiving element. It does so by projecting part way into the section 46m of the bolt passage contained within the tongue when slide block 58 is in its extended position thus bridging the joint defined by parallel opposed wall surfaces 44 and 50, all of which is, once again, shown in FIG. 2. Quite obviously, shuttle trunnion 56 does not have to be extended all the way into contact with the piston so long as a substantial portion of the former is housed within that portion of the bore containing the latter; however, there is no reason for not doing so and the abutting relationship, therefore, is preferred. To a considerable degree, the same thing is true of the other element of the bolt subassembly 52 specifically, slide block 58. Functionally, it must merely extend sufficiently far into bore passage section 46m in the tongue to bridge the joint between it and the belt-receiving element. The extent to which the downstream slide bloc 58 enters that section 46m of the bolt-receiving passage contained within tongue 28 is, of course, determinative of the degree of penetration of the shuttle trunnion 56 into the portion of the bolt passage 46u housing the piston and neck of elbow 60. A substantial degree of penetration is desirable to insure a securely locked relation and bearing area adequate to withstand any loads tending to pull the tongue 28 from the belt-receiving element 30. However, so long as this bearing area requirement is satisfied, a total stroke of just slightly less than that at which the piston 54 becomes separated from O-ring 90 within the reduced diameter section of neck 68 of elbow 60 is considered ample. All in all, the best and preferred construction is to have the piston and elbow section fully telescoped one inside the other, upstream shuttle trunnion 56 in abutting relation to the piston and downstream slide block 58 abutting its companion in the shuttle trunnion subassembly when the system is in its locked position.

Slide block 58 is retained within its section of the bore in the same manner as the elbow 60, namely, by retaining pin 92 intersecting said bore in tangent relation to wide annular groove 94. Obviously, the pin and slot arrangement used on the shuttle trunnion 56 would work just as well. In either instance, the length of the slot or width of the groove must be such as to permit an upstream excursion of the slide block sufficiently far to enter the bolt passage section 46m a substantial distance. Pin 92 and annular groove 94 also cooperate with one another to perform a second very important function, specifically, to produce the limit stop that defines the unlocked position of the bolt subassembly. In other words, when the unit has been actuated, shuttle trunnion 56 must be moved downstream into a position wholly contained within the tongue's bolt passage section while slide block 58 must be completely removed from the latter as the tongue will not release. Alternatively, retaining pin 64 and the slot 62 in slide block 56 could function as the limit stop if one preferred. There are, of course, many other configurations well known in the prior art that can be used to limit the excursion of the shuttle trunnion from its locked into its unlocked position, the configuration shown being intended as only illustrative of one such limit stop.

Slide block 58 like piston 54 is shown encircled by an O-ring 96 which functions merely as a dirt seal and not a pressure retaining member. For this reason, its presence is not critical and it can, if desired, be eliminated. In the particular form shown, downstream slide block 58 like shuttle trunnion 56 is a solid cylindrical member freely slidable in the bore.

The entire bolt subassembly 52 is held in its retracted or locked position by a shear pin 98 that intersects the bolt passage 46 and passes through diametrical opening 100 in the downstream slide block 58. The pin receiving opening 102 in the belt receiving member should be located such that it goes all the way through the latter as this enables double-shear force to unlock the bolt if preferred to single shear, and also enables the sheared ends of the pin to be driven out and removed. With a load of around 600 pounds on the coupling tending to separate the tongue from the belt receiving element 30, 1,000 p.s.i. or less will easily shear pin 98 when total pressure in excess of 2,500 p.s.i. is readily generated by either an encapsulated gas under pressure or a gas generated "in situ" pyrotechnically. Once the bolt subassembly has been fired, downstream slide block 58 will project beyond the end of the belt receiving element clearly indicating the "unlocked" condition of the assembly. Also, to relock the coupling, the operator need only reinsert the tongue into notch 40 in the belt-receiving element and push the bolt upstream into its engaged position. As such, while the bolt cannot be reactuated if the gas supply has been exhausted, the manual disconnect remains fully operative. It has been found that specific provision needn't be made for venting the gas in the case of hot squib-generated gas, because it cools quickly and thus reduces its pressure sufficiently to permit the bolt subassembly to be manually locked. It may be necessary to provide venting by a vent orifice in the face of piston 54 where the pressure of the source is not sufficiently expended in the trunnion actuation to permit reconnecting. A redundant pressure source may be provided for multiple actuations of the system.

In the particular configuration illustrated, the upstream end of the bolt passage section 46u is counterbored and enlarged as are the downstream ends of bolt passage sections 46m and 46d. The piston and slide blocks of the shuttle trunnion subassembly are provided with sections of increased diameter corresponding to these enlarged bore sections as shown. The intersections of these different diameter cylindrical sections of the bolt subassembly elements and the bolt passages in which they reciprocate result in annular shoulders arranged in opposed abutmentforming relation that can be used as limit stops in place of the pins and associated slots or grooves if desired. In the specific configuration illustrated, these features have no particular functional significance.

Finally, with reference to FIGS. 1 and 4, the specific type of power supply shown comprises a nitrogen filled cartridge 104 screwed or otherwise attached into the actuator 106 which contains a cam-operated firing pin 108. Upon pivotal movement of the actuator into the broken line position, the cam 110 depresses the firing pin which, in turn, punctures a hole in the neck 112 of the cartridge thus releasing the gas into manifold 84 where it is carried to the several gas operated disconnect couplings of the present invention by high pressure hoses 82 routed as shown in FIG. 1. Alternatively, a pyrotechnical power supply can be substituted for the cold compressed gas supply shown wherein the gas is generated chemically "in situ." Both systems have their advantages and disadvantages, however, since neither is novel nor does it form any part of the instant invention other than as a source of gas under pressure, no useful purpose would be served by delving into the matter further.

What is claimed is:

1. A gas operated quick disconnect coupling which comprises, in combination, a first connector having one end adapted for connection to a strap and its other end bifurcated to define a pair of transversely spaced sections with a gap therebetween, said sections having transversely extending openings therethrough arranged in aligned coaxial relation to one another on opposite sides of said gap, a first section of said pair having the side thereof remote from said gap fitted with means for connecting the opening therein to a source of pressure fluid; a connector element adapted to be releasably coupled to a second connector and having an end thereof sized for insertion into said gap between said first connector sections, said connector element having a transversely extending opening in said end axially alignable with the openings through said first connector sections and cooperating therewith to define a bolt passage; bolt forming means mounted within said bolt passage for movement therein between a locking position for locking said connector element to said first connector and an unlocking position for releasing said connector element from said first connector, said bolt forming means comprising a piston member in said opening in the first section responsive to the introduction of fluid pressure therebehind for limited axial movement within said first section from a locking position to an unlocking position, a shuttle trunnion coextensive with and slidably retained in the opening in said connector element for axial movement therein between an extended locking position wherein one end of said trunnion projects into the opening in said first section and a retracted unlocking position wherein the entire trunnion is totally contained within said connector element opening, and a slide block slidably mounted in the opening in said second section of said pair for axial movement therein between an extended locking position wherein one end of said slide block is partially housed within the opening in said connector element and a retracted unlocking position wherein said slide block is entirely removed from said connector element, the lengths of said bolt forming piston, shuttle trunnion, and slide block being such that movement of said piston to its unlocking position effects positioning of said shuttle trunnion and slide block to their respective retracted unlocking positions thereby releasing said connector element and the second connector coupled therewith from the first connector.

2. The quick disconnect coupling defined in claim 1 including stop means between said connector element and said shuttle trunnion for limiting the movement of said shuttle trunnion between a locking position wherein said shuttle trunnion engages with said first section and an unlocking position wherein said shuttle trunnion is totally contained within and coextensive with said opening in said connector element.

3. The quick disconnect coupling defined in claim 1 wherein the end of the slide block opposite from the connector element engaging end is sized to project beyond the side of said second section remote from said gap when the bolt forming means is in the unlocked position, said projecting end portion indicating the position of said bolt forming means and being manually engagable for axially moving said bolt forming means to relock said connector element into said first connector.

4. The quick disconnect coupling defined in claim 1 including stop means between said second section and said slide for limiting the movement of said slide between a locking position wherein said slide engages with said connector element and an unlocking position wherein said slide is retracted from said connector element and one end thereof projects outwardly from the side of said second section opposite said gap.

5. The quick disconnect coupling defined in claim 1 including a stop shoulder defined in the opening in said first section engagable by a flange on said piston for limiting the unlocking movement of said piston and to prevent the same from extending into the opening and said connector element.

6. The quick disconnect coupling defined in claim 1 wherein a hose fitting having a pressure fluid passage therethrough is mounted within the intake end of said first section and wherein the juxtaposed ends of said fitting and said piston member are shaped to telescope one within the other.

7. The quick disconnect coupling defined in claim 1 wherein the elements of the bolt forming means lie in abutting end to end relation in both the locking and the unlocking positions thereof.

8. The quick disconnect coupling defined in claim 1 wherein the bottom of the gap defined in the first connector and the adjacent end of the connector element are shaped to define mating surfaces adapted to cooperate with one another to orient said parts relative to one another.

9. The quick disconnect coupling defined in claim 1 wherein the pressure fluid comprises a compressed gas.

10. The quick disconnect coupling defined in claim 1 wherein said second section and said slide are releasably coupled by a shear pin to releasably retain said bolt forming means in the locking position.

* * * * *